US012786133B2

(12) United States Patent
Won

(10) Patent No.: US 12,786,133 B2
(45) Date of Patent: Nov. 3, 2026

(54) METHOD AND APPARATUS FOR MANAGING A PARAMETER IN A TIME SENSITIVE NETWORK

(71) Applicant: Nokia Technologies Oy, Espoo (FI)

(72) Inventor: Sung Hwan Won, Flower Mound, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/519,775

(22) Filed: Nov. 5, 2021

(65) Prior Publication Data

US 2022/0150111 A1 May 12, 2022

Related U.S. Application Data

(60) Provisional application No. 63/110,757, filed on Nov. 6, 2020.

(51) Int. Cl.
*H04L 47/28* (2022.01)
*H04L 9/40* (2022.01)
(Continued)

(52) U.S. Cl.
CPC .......... *H04L 47/28* (2013.01); *H04L 12/4625* (2013.01); *H04L 41/0803* (2013.01);
(Continued)

(58) Field of Classification Search
CPC . H04L 41/0803; H04L 12/4625; H04L 47/24; H04L 63/0236; H04J 3/025; H04W 92/10; H04W 88/14; H04W 28/0215
See application file for complete search history.

(56) References Cited

U.S. PATENT DOCUMENTS 11,870,703 B2 * 1/2024 Lin ......................... H04L 47/72
2022/0078662 A1 * 3/2022 Wang ...................... H04L 47/20
(Continued)

FOREIGN PATENT DOCUMENTS

WO WO-2022020020 A1 * 1/2022

OTHER PUBLICATIONS

Thomas, L. (Intel), Support for per-stream filtering and policing, Feb. 20-28, 2020, 3GPP TSG-CT WG1 Meeting #122-e, C1-200835, https://portal.3gpp.org/ngppapp/TdocList.aspx?meetingId=37767, pp. 1-11. (Year: 2020).*

(Continued)

*Primary Examiner* — Gregory Todd
(74) *Attorney, Agent, or Firm* — Alston & Bird LLP

(57) ABSTRACT

Methods, systems, apparatuses, and computer program products are provided for managing configuration of ports of an entity in a device or a mobile communication system, and to facilitate integration of the device and the mobile communication system with a time sensitive networking (TSN) network. A feature support information element may be set to indicate whether per-instance parameter handling of a stream filter instance table is supported by an entity, such as a TT including a device side TSN translator (DS-TT)/network side (NW-TT), and/or network function such as a TSN application function (TSN AF). Accordingly, a stream filter instance value for at least one, or each, stream filter instance of a stream filter instance table may be populated by a TT or TSN AF and sent to the other of the TT or TSN AF.

13 Claims, 10 Drawing Sheets

(51) Int. Cl.
*H04L 12/46* (2006.01)
*H04L 41/0803* (2022.01)
*H04W 88/14* (2009.01)
*H04W 92/10* (2009.01)

(52) U.S. Cl.
CPC ......... *H04L 63/0236* (2013.01); *H04W 88/14* (2013.01); *H04W 92/10* (2013.01)

(56) References Cited

U.S. PATENT DOCUMENTS

2022/0150805 A1* 5/2022 Munz .................. H04L 41/0806
2023/0188381 A1* 6/2023 Luetzenkirchen .. H04L 12/4625 370/328
2023/0269220 A1* 8/2023 de la Oliva ............. H04L 61/59 370/312

OTHER PUBLICATIONS

3GPP, 3rd Generation Partnership project; Time-Sensitive Networking (TSN) Application Function (AF) to Device-Side TSN Translator (DS-TT) and Network-Side TSN Translator (NW-TT) protocol aspects, 3GPP TS 24.519 v16.2.0, Sep. 2020. (Year: 2020).*

Intel, 3GPP TSG-CT WG1 Meeting #122-e C1-200835, Electronic meeting; Feb. 20-28, 2020 revison of C1-200329, pp. 1-11. (Year: 2020).*

3GPP TSG-CT Meeting #90e CP-203267, Change Request 24.519 CR 0022 rev 2 Current Version 16.2.0, E-Meeting, Dec. 6-8, 2020, pp. 1-10. (Year: 2020).*

"IEEE Standard for Local and Metropolitan Area Network—Bridges and Bridged Networks," in IEEE Std 802.1Q-2018 (Revision of IEEE Std 802.1Q-2014) , vol. No. pp. 174-1993, Jul. 6, 2018, doi: 10.1109/IEEESTD.2018.8403927. (Year: 2018).*

"3rd Generation Partnership Project; Technical Specification Group Core Network and Terminals; 5G System (5GS); Time-Sensitive Networking (TSN) Application Function (AF) to Device-Side TSN Translator (DS-TT) and Network-Side TSN Translator (NW-TT) protocol aspects; Stage 3 (Release 16)", 3GPP TS 24.519v16.2.0, (Sep. 2020), 70 pages.

"3rd Generation Partnership Project; Technical Specification Group Services and System Aspects; System architecture for the 5G System (5GS); Stage 2 (Release 16)", 3GPP TS 23.501 v16.6.0, (Sep. 2020), 447 pages.

"IEEE Standard for Local and Metropolitan Area Networks—Bridges and Bridged Networks", IEEE Computer Society, IEEE Std 802.1Q-2018, (Jul. 6, 2018), 1993 pages.

Office Action for European Application No. 21206507.2 dated Jul. 21, 2025, 12 pages.

Office Action for European Application No. 21206507.2 dated Dec. 20, 2023, 10 pages.

Extended European Search Report for European Application No. 21206507.2 dated Mar. 25, 2022, 13 pages.

"Draft Standard for Local and Metropolitan Area Networks—Bridges and Bridged Networks—Amendment: Asynchronous Traffic Shaping", IEEE Computer Society, IEEE P802.1Qcr/D2.3, (May 19, 2020), 152 pages.

"Draft Standard for Local and Metropolitan Area Networks—Bridges and Bridged Networks—Amendment: Per-Stream Filtering and Policing", IEEE Computer Society, IEEE P802.1Qci/D1.4, (Sep. 13, 2016), 62 pages.

Nokia et al, "Per-Instance Parameter Handling for Stream Filter Table", 3GPP TSG-CT WG1 Meeting #127-e, C1-207687, (Nov. 13-20, 2020), 15 pages.

Nokia et al, "Per-Instance Parameter Handling for Stream Filter Table", 3GPP TSG-CT WG1 Meeting #127-e, C1-207404, (Nov. 13-20, 2020), 8 pages.

* cited by examiner

| 8 7 6 5 4 3 2 1 | |
|---|---|
| Stream filter instance table IEI | octet 1 |
| Length of Stream filter instance table contents | octet 2<br>octet 3 |
| Stream filter instance 1 | octet 4*<br>octet m* |
| ... | |
| Stream filter instance n | octet n*<br>octet o* |

FIG. 1B

| 8 7 6 5 4 3 2 1 | |
|---|---|
| Stream gate instance table IEI | octet 1 |
| Length of Stream gate instance table contents | octet 2<br>octet 3 |
| Stream gate instance 1 | octet 4*<br>octet a* |
| ... | |
| Stream gate instance N | octet b*<br>octet c* |

| 8 7 6 5 4 3 2 1 | |
|---|---|
| Length of Stream gate instance contents | octet 4<br>octet 5 |
| StreamGateInstance (90) | octet 6<br>octet 9 |
| PSFPAdminBaseTime value | octet 10<br>octet 19 |
| PSFPAdminCycleTime value | octet 20<br>octet 27 |
| PSFPTickGranularity value | octet 28<br>octet 31 |
| PSFPAdminControlListLength value | octet 32<br>octet 33 |
| PSFPAdminControlList contents | octet 34<br>octet a |

FIG. 1C

| 8 | 7 | 6 | 5 | 4 | 3 | 2 | 1 | |
|---|---|---|---|---|---|---|---|---|
| DS-TT port neighbor discovery configuration for DS-TT ports IEI | | | | | | | | octet 1 |
| Length of DS-TT port neighbor discovery configuration for DS-TT ports contents | | | | | | | | octet 2<br>octet 3 |
| DS-TT port neighbor discovery configuration for DS-TT ports instance 1 | | | | | | | | octet 4*<br>octet x* |
| ... | | | | | | | | |
| DS-TT port neighbor discovery configuration for DS-TT ports instance n | | | | | | | | octet y*<br>octet z* |

| 8 | 7 | 6 | 5 | 4 | 3 | 2 | 1 | |
|---|---|---|---|---|---|---|---|---|
| Length of DS-TT port neighbor discovery configuration for DS-TT ports instance | | | | | | | | octet 4<br>octet 5 |
| DS-TT port number value — 92 | | | | | | | | octet 6<br>octet 7 |
| lldpV2LocPortIdSubtype value | | | | | | | | octet 8 |
| Length of lldpV2LocPortId value | | | | | | | | octet 9 |
| lldpV2LocPortId value | | | | | | | | octet 10<br>octet x |

FIG. 1D

| 8 7 6 5 4 3 2 1 | |
|---|---|
| Discovered neighbor information for DS-TT ports IEI | octet 1 |
| Length of Discovered neighbor information for DS-TT ports contens | octet 2<br>octet 3 |
| Discovered neighbor information for DS-TT ports instance 1 | octet 4*<br>octet x* |
| ... | |
| Discovered neighbor information for DS-TT ports instance n | octet y*<br>octet z* |

| 8 7 6 5 4 3 2 1 | |
|---|---|
| Length of Discovered neighbor information for DS-TT ports instance | octet 4<br>octet 5 |
| DS-TT port number value | 94 octet 6<br>octet 7 |
| lldpTTL value | octet 8<br>octet 9 |
| lldpV2RemChassisIdSubtype value | octet 10 |
| Length of lldpV2RemChassisId value | octet 11 |
| lldpV2RemChassisId value | octet 12<br>octet a |
| lldpV2RemPortIdSubtype value | octet a+1 |
| Length of lldpV2RemPortId value | octet a+2 |
| lldpV2RemPortId value | octet a+3<br>octet x |

FIG. 1E

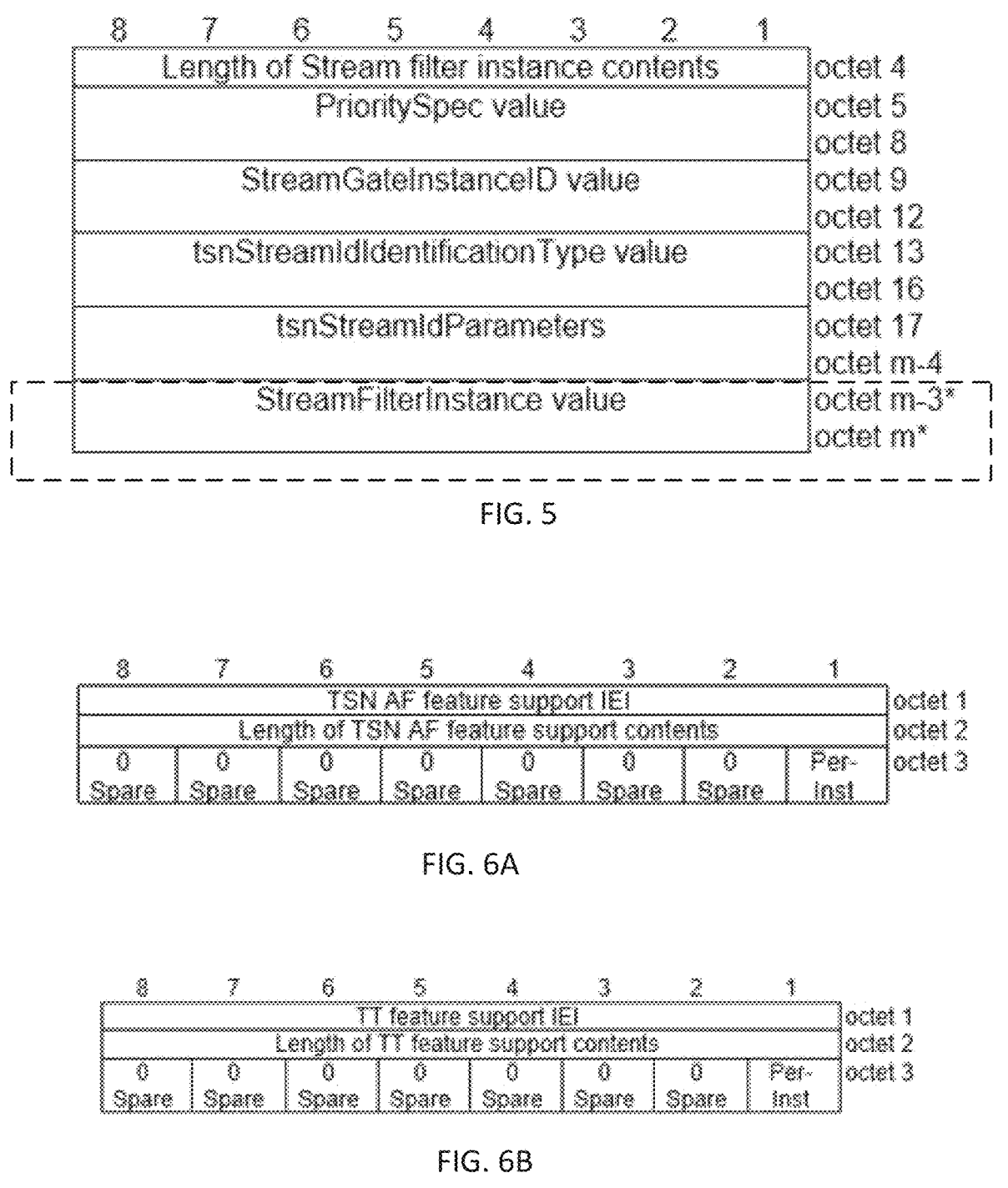

| 8 7 6 5 4 3 2 1 | |
|---|---|
| Length of Stream filter instance contents | octet 4 |
| PrioritySpec value | octet 5<br>octet 8 |
| StreamGateInstanceID value | octet 9<br>octet 12 |
| tsnStreamIdIdentificationType value | octet 13<br>octet 16 |
| tsnStreamIdParameters | octet 17<br>octet m-4 |
| StreamFilterInstance value | octet m-3*<br>octet m* |

FIG. 5

| 8 | 7 | 6 | 5 | 4 | 3 | 2 | 1 | |
|---|---|---|---|---|---|---|---|---|
| TSN AF feature support IEI | | | | | | | | octet 1 |
| Length of TSN AF feature support contents | | | | | | | | octet 2 |
| 0<br>Spare | 0<br>Spare | 0<br>Spare | 0<br>Spare | 0<br>Spare | 0<br>Spare | 0<br>Spare | Per-<br>inst | octet 3 |

FIG. 6A

| 8 | 7 | 6 | 5 | 4 | 3 | 2 | 1 | |
|---|---|---|---|---|---|---|---|---|
| TT feature support IEI | | | | | | | | octet 1 |
| Length of TT feature support contents | | | | | | | | octet 2 |
| 0<br>Spare | 0<br>Spare | 0<br>Spare | 0<br>Spare | 0<br>Spare | 0<br>Spare | 0<br>Spare | Per-<br>inst | octet 3 |

FIG. 6B

METHOD AND APPARATUS FOR MANAGING A PARAMETER IN A TIME SENSITIVE NETWORK

CROSS-REFERENCE TO RELATED APPLICATIONS

This application claims the benefit of priority to U.S. Provisional Application No. 63/110,757, filed Nov. 6, 2020 and titled, "METHOD AND APPARATUS FOR MANAGING A PARAMETER IN A TIME SENSITIVE NETWORK," and is hereby incorporated by reference in its entirety.

TECHNICAL FIELD

An example embodiment of the present disclosure generally relates to an apparatus, a method, and a computer program product relating to integration of a wireless network with a time sensitive networking (TSN) network.

BACKGROUND

Fifth generation (5G) technology is intended to provide high capacity mobile multimedia with high data rates and low latency connectivity. 5G technology improves a variety of telecommunication services offered to the end users and helps to support massive broadband that delivers gigabytes of bandwidth per second on demand.

A 5G network can be implemented with time sensitive networking (TSN) protocols. Third generation partnership project (3GPP) 5G technology is one example of a next generation of network architecture, and provides standardization and protocols for integrating a 5G network with TSN. In order to support the integration, at both edges of a 5G system, including user equipment (UE) and the user plane function (UPF), TSN translators are deployed. The TSN translators (TT) may include a device side TSN translator (DS-TT) and network side (NW-TT). TSN application functions were introduced to provide a control plane translator functionality for the integration, as illustrated in FIG. 1A, which depicts an example of a system architecture of a TSN bridge 10 (FIG. 4.4.8.2-1 in 3GPP TS 23.501).

In order to manage Ethernet port parameters in the DS-TT and NW-TT, the TSN AF and a TT can exchange messages. The messages may be defined in a messaging protocol, such as 3GPP TS 24.519, which defines a protocol for messaging between TSN AF and DS-TT, and TSN AF and NW-TT. The messaging protocol includes several Ethernet port management and bridge management parameters, each of which can include multiple instances.

BRIEF SUMMARY

Methods, apparatuses and computer program products are provided in accordance with certain example embodiments to manage parameters relating to port management.

A method is provided, including managing configuration of one or more ports in a device or a mobile communication system integrated with a time sensitive networking (TSN) network by populating, by at least one of a network function or an entity associated with the device or the mobile communication system, a stream filter instance value in at least one stream filter instance of the stream filter instance table, wherein the stream filter instance table is provided to the other of the network function or the entity.

In certain embodiments, the network function provides the entity the stream filter instance table to facilitate configuration of the stream filter instance table in the entity, and wherein the entity provides the stream filter instance table to the network function to report a status of the stream filter instance table in the entity.

According to certain embodiments, the one or more ports are Ethernet ports. The entity may include a TSN translator (TT), such as a device side TSN translator (DS-TT) and/or network side TSN translator (NW-TT) and the network function may include a TSN application function (AF). In certain embodiments, the device comprises the entity. In certain embodiments, the network function and the entity are embodied by a common device.

In some embodiments, the stream filter instance value in at least one stream filter instance of the stream filter instance table is populated by the entity in response to determining the network function indicates that per-instance parameter handling of the stream filter instance table is supported. In some embodiments, the stream filter instance value in at least one stream filter instance of the stream filter instance table is populated by the network function in response to determining the entity indicates that per-instance parameter handling of the stream filter instance table is supported.

The method may further include setting a feature support information element in a message pertaining to port management to indicate whether per-instance parameter handling of the stream filter instance table is supported.

An apparatus is also provided, included at least one processor and at least one memory including computer program code. The at least one memory and the computer program code configured to, with the processor, cause the apparatus to at least manage configuration of one or more ports in a device or a mobile communication system integrated with a time sensitive networking (TSN) network by populating, by at least one of a network function or an entity associated with the device or the mobile communication system, a stream filter instance value in at least one stream filter instance of the stream filter instance table. The stream filter instance table is transmitted to the other of the network function or the entity.

In certain embodiments, the at least one memory and the computer program code configured to, with the processor, cause the apparatus to set a feature support information element in a message pertaining to port management to indicate whether per-instance parameter handling of the stream filter instance table is supported.

A computer program product is provided, including at least one non-transitory computer-readable storage medium having computer-executable program code instructions stored therein, the computer-executable program code instructions comprising program code instructions to manage configuration of one or more ports in a device or a mobile communication system integrated with a time sensitive networking (TSN) network by populating, by at least one of a network function or an entity associated with the device or the mobile communication system, a stream filter instance value in at least one stream filter instance of the stream filter instance table. The stream filter instance table is transmitted to the other of the network function or the entity.

In certain embodiments, the computer-executable program code instructions further comprise program code instructions to set a feature support information element in a message pertaining to port management to indicate whether per-instance parameter handling of the stream filter instance table is supported.

An apparatus is also provided, including means for managing configuration of one or more ports in a device or a mobile communication system integrated with a time sensitive networking (TSN) network by populating, by at least one of a network function or an entity associated with the device or the mobile communication system, a stream filter instance value in at least one stream filter instance of the stream filter instance table. The stream filter instance table is transmitted to the other of the network function or the entity.

In certain embodiments, the apparatus further comprises means for setting a feature support information element in a message pertaining to port management to indicate whether per-instance parameter handling of the stream filter instance table is supported.

BRIEF DESCRIPTION OF THE DRAWINGS

Figure 1A:
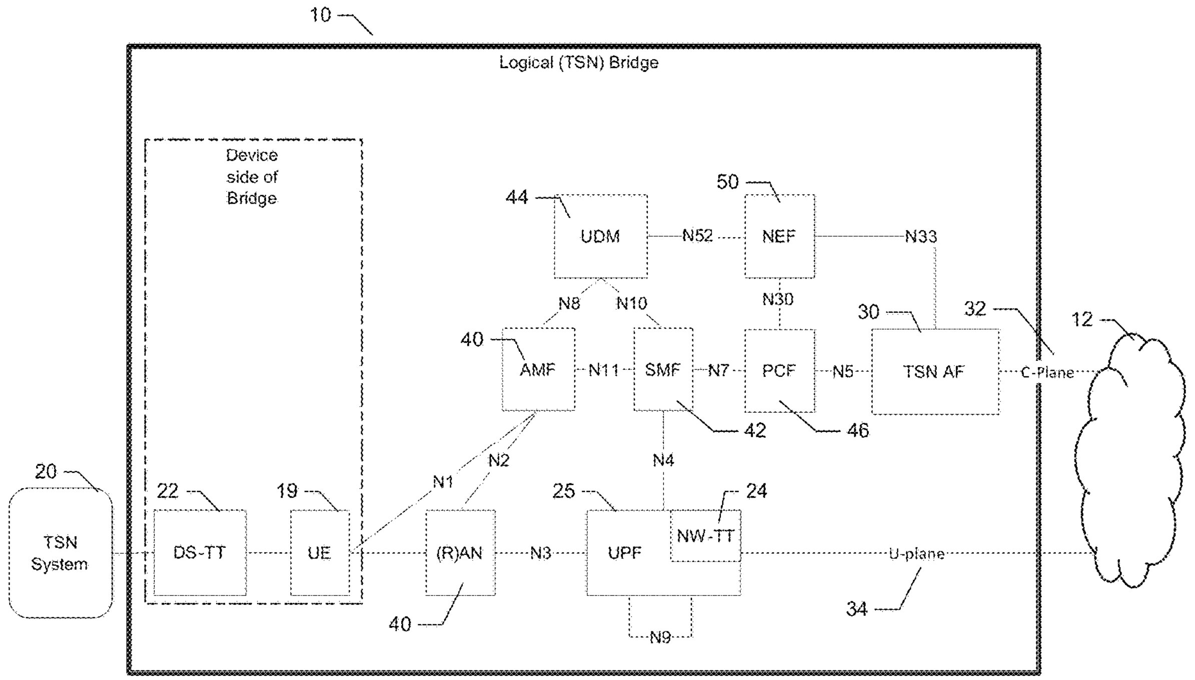
Figure 2A:
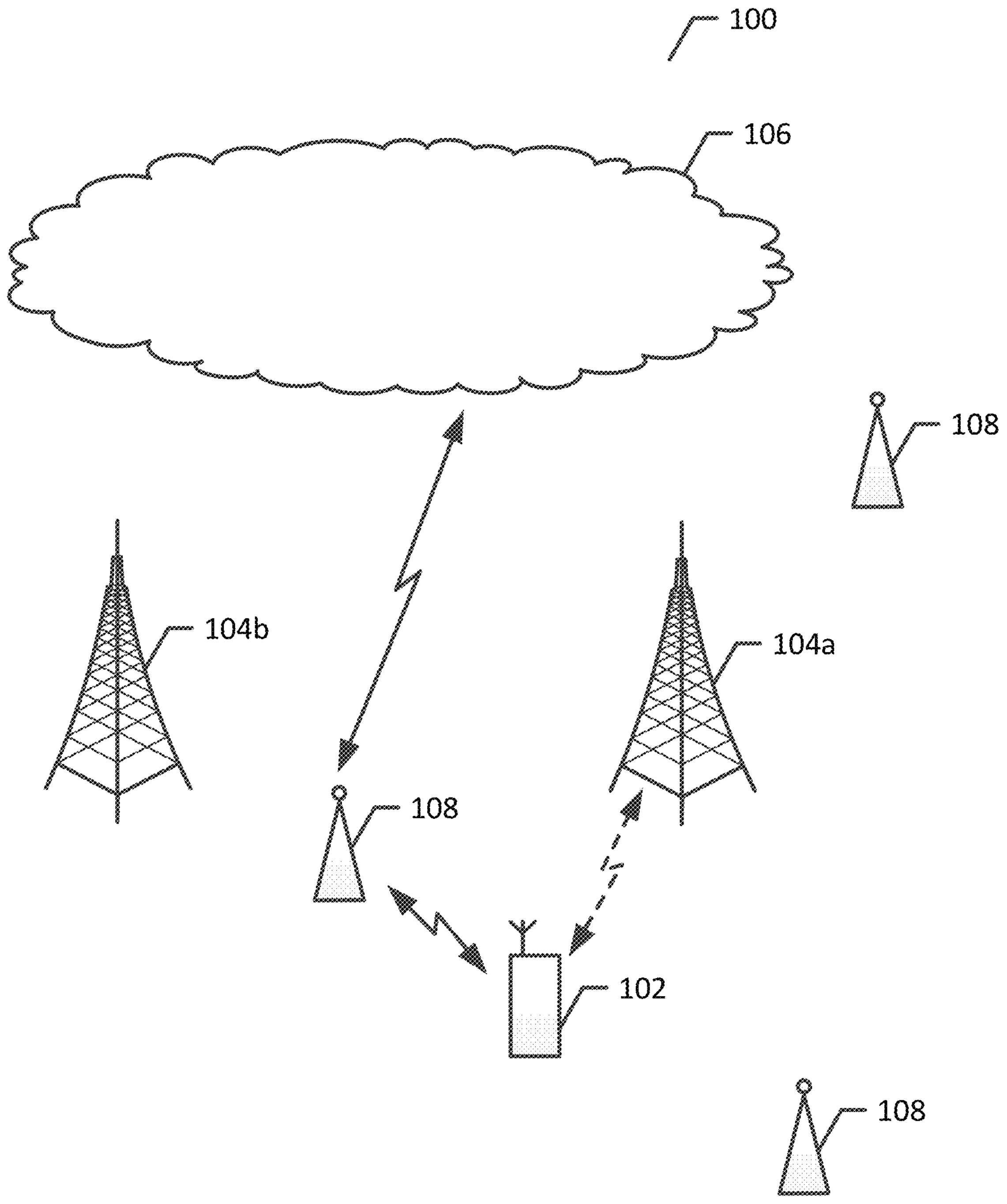
Figure 2B:
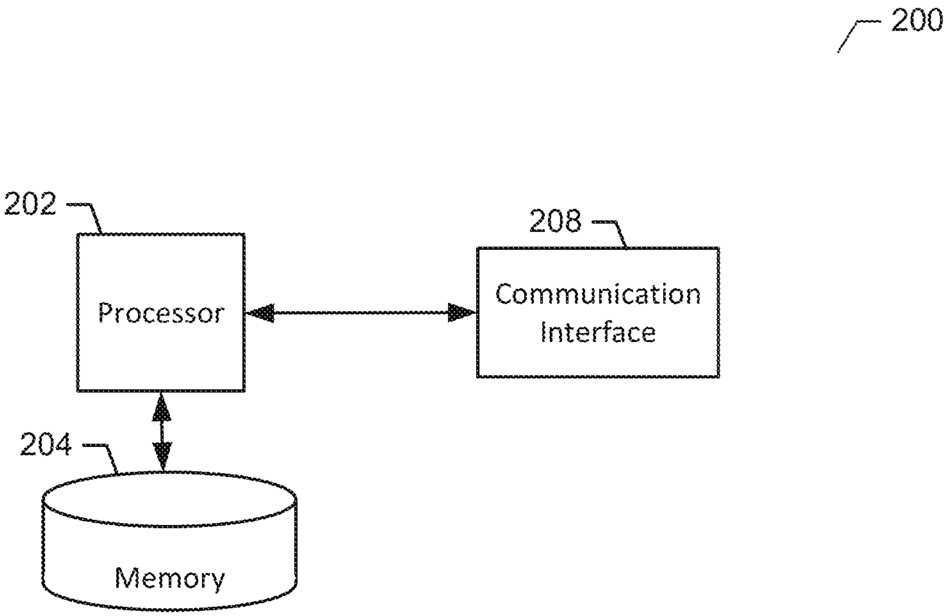
Figure 3:
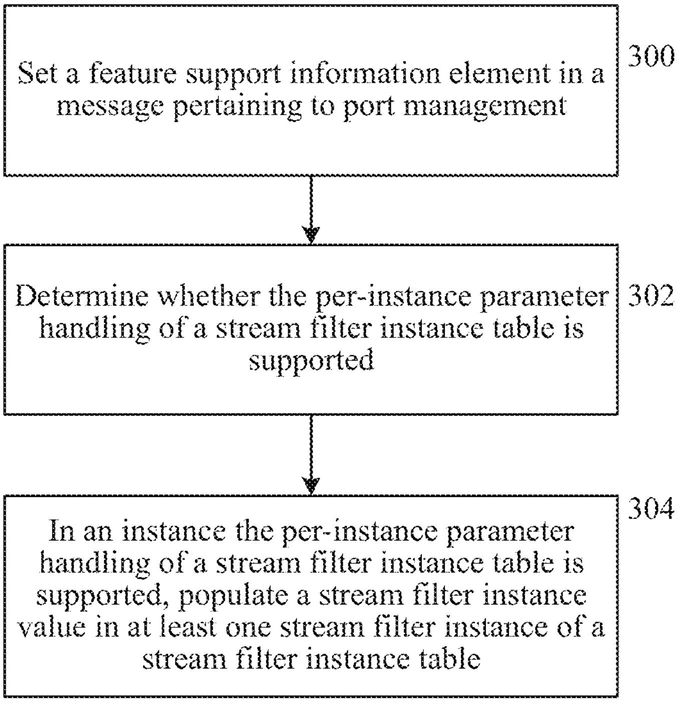
Figure 4A:
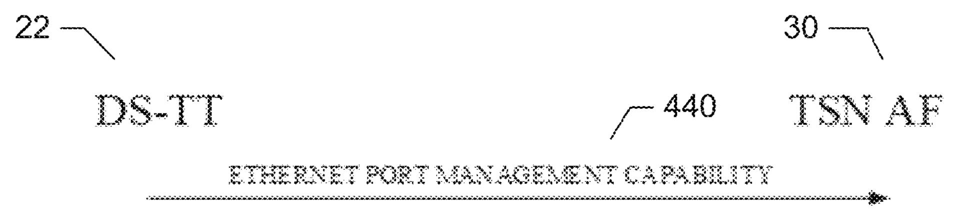
Figure 4B:
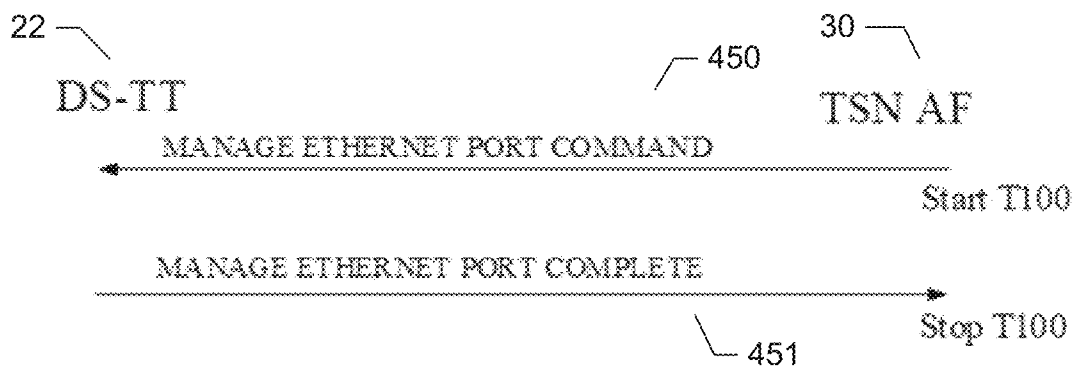
Figure 4C:
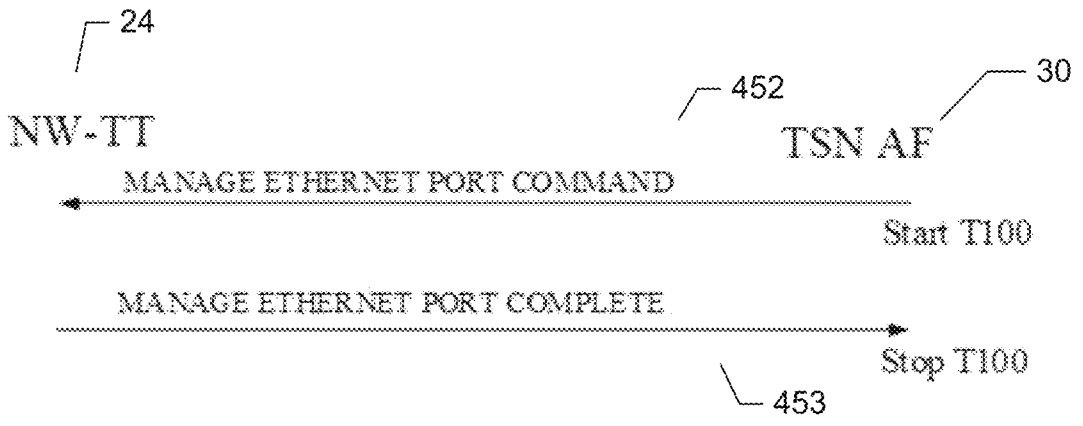
Figure 7A:
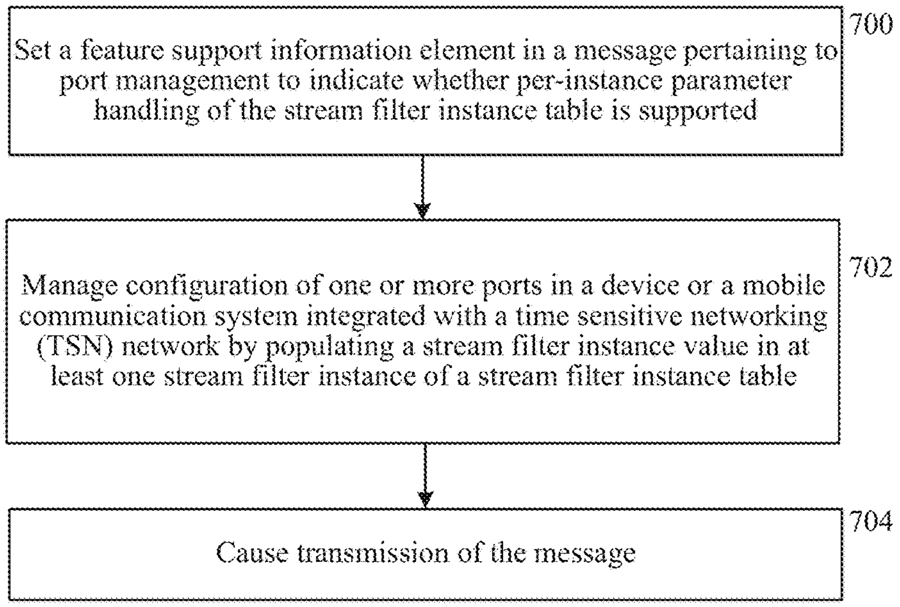
Figure 7B:
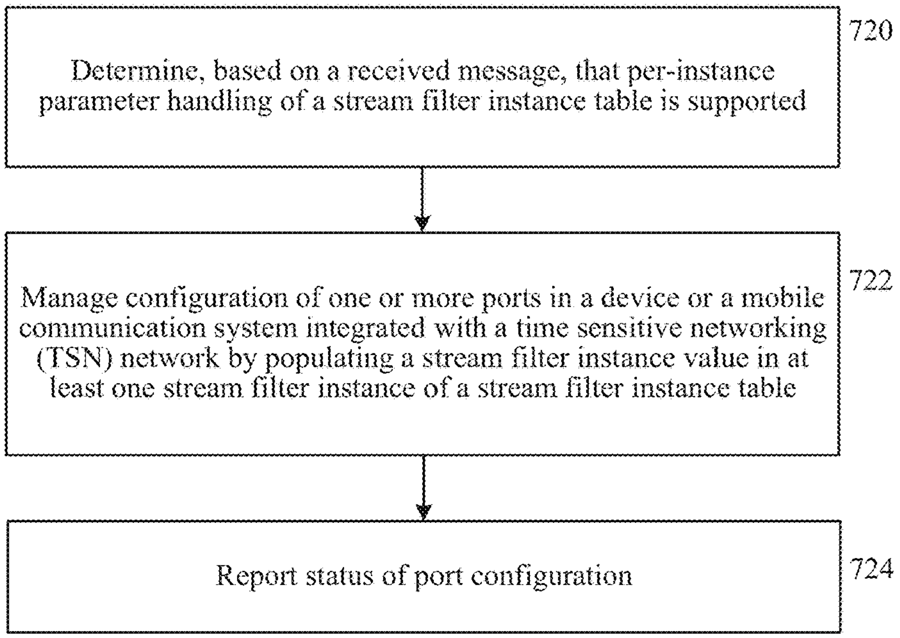

Having thus described certain example embodiments of the invention in general terms, reference will now be made to the accompanying drawings, which are not necessarily drawn to scale, and wherein:

FIG. 1A depicts an example architecture of a TSN Bridge in accordance with certain embodiments;

FIGS. 1B-1E are tables of information elements in accordance with certain embodiments;

FIG. 2A depicts an example system environment in which a method and apparatus may be implemented accordance with certain embodiments;

FIG. 2B is a block diagram of a core network apparatus configured in accordance with certain embodiments;

FIG. 3 is a flowchart of operations performed in accordance with certain embodiments;

FIGS. 4A-4C depict example messages transmitted in accordance with certain embodiments;

FIG. 5 depicts an example stream filter instance configuration in accordance with certain embodiments;

FIGS. 6A and 6B depict example specifications for feature support information elements (IE) in accordance with certain embodiments; and FIGS. 7A and 7B are flowcharts of operations performed in accordance with certain embodiments.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As defined herein, a "computer-readable storage medium," which refers to a physical storage medium (e.g., volatile or non-volatile memory device), may be differentiated from a "computer-readable transmission medium," which refers to an electromagnetic signal.

FIG. 1A shows an example implementation for a logical TSN bridge 10 according to an example embodiment. The logical TSN bridge 10 facilitates integration between a 5G system (5GS) 12 and a TSN system 20. In order to support the integration, at both edges of a 5GS (e.g., user equipment (UE) 19 and user plane (U-plane) function (UPF) 25), the DS-TT 22 and NW-TT 24 are respectively deployed. In addition, TSN AF 30 was introduced to provide the control plane (C-plane) translator functionality for the integration. The logical TSN bridge implements TSN ethernet protocols to exchange messages between a TSN system and the C-plane 32 and/or U-plane 34.

FIG. 1A also illustrates a (radio) access network ((R)AN), an access and mobility management function (AMF) 40, session management function (SMF) 42, unified data management function (UDM) 44, a policy control function (PCF) 46 and a network exposure function (NEF) 50, according to 3GPP protocol.

In order to manage port parameters, such as Ethernet port parameters, in the DS-TT 22 and NW-TT 24, and bridge parameters in the NW-TT 24, the TSN AF 30 and the TT can exchange messages and these messages may be defined by certain protocols, such as 3GPP TS 24.519.

According to the 3GPP protocol, there are four Ethernet port management/bridge management parameters including a stream filter instance table, a stream gate instance table, a DS-TT port neighbor discovery configuration for DS-TT ports, and discovered neighbor information for DS-TT ports. Any or all of the four parameters may include multiple instances.

FIG. 1B illustrates a table of information elements according to the 3GPP protocol for the stream filter instance table information element (FIG. 9.8.1 in 3GPP TS 24.519).

FIG. 1C illustrates a table of information elements according to the 3GPP protocol for stream gate instance table information element (FIGS. 9.9.1 and 9.9.2 in 3GPP TS 24.519).

FIG. 1D illustrates a table of information elements according to the 3GPP protocol for DS-TT port neighbor discovery configuration for DS-TT ports information element (FIGS. 9.10.1 and 9.10.2 in 3GPP TS 24.519).

FIG. 1E illustrates a table of information elements according to the 3GPP protocol for discovered neighbor information for DS-TT ports information element (FIGS. 9.11.1 and 9.11.2 in 3GPP TS 24.519).

Except for the stream filter instance table of FIG. 1B, each of the other three parameters, such as those depicted in FIGS. 1C-1E, has a field identifying an instance. A stream gate instance in the stream gate instance table includes a StreamGateInstance field 90 (see FIG. 1C). A DS-TT port neighbor discovery configuration for DS-TT ports instance in the DS-TT port neighbor discovery configuration for DS-TT ports includes a DS-TT port number value 92 (see FIG. 1D). A discovered neighbor information for DS-TT ports instance in the discovered neighbor information for DS-TT ports includes a DS-TT port number value 94 (see FIG. 1E). Accordingly, With these fields it is merely shown that for other parameters it is possible to specify one certain instance in the respective table, whereas, before the invention, this was not possible for the stream filter instance table The instance identification entity (e.g., StreamGateInstance, DS-TT port number value) enables per-instance parameter setting, per-instance parameter status reporting, and per-instance parameter update result reporting.

Considering that four octets are assigned for PSFPMaxStreamFilterInstances and PSFPMaxStreamGateInstances and two octets are assigned for DS-TT port number value, the number of instances can be significantly large. Therefore, according to certain example embodiments provided herein, per-instance parameter handling is enabled for the stream filter instance table. A method, computer program product, and apparatus for enabling the per-instance parameter handling to enable the stream filter instance are described in further detail herein.

An example embodiment will be illustrated herein in conjunction with example communication systems and associated techniques for providing data transport in communication systems. It should be understood, however, that the scope of the claims is not limited to particular types of communication systems, processes and/or protocols disclosed. Some embodiments can be implemented in a wide variety of other types of communication systems, using alternative processes, operations and/or protocols. For example, although illustrated in the context of wireless cellular systems utilizing 3rd Generation Partnership Project (3GPP) system elements such as a 3GPP next generation system (5G), the disclosed embodiments can be adapted to a variety of other types of communication systems including those operated in accordance with different standards.

In accordance with illustrative embodiments implemented in a 5G communication system environment, one or more 3GPP technical specifications (TS) and technical reports (TR) provide further explanation of user equipment and network elements/functions and/or operations that interact with one or more illustrative embodiments, e.g., the 3GPP TS 24.519. However, while illustrative embodiments are well-suited for implementation associated with the above-mentioned 5G-related 3GPP standards, alternative embodiments are not necessarily intended to be limited to any particular standards.

FIG. 2A depicts an example communication system environment in which implementations in accordance with an example embodiment of the present invention may be performed. The depiction of system environment 100 in FIG. 2A is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 2A, and the system environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 2A are shown as discrete, separate elements, other configurations may be used in connection with the methods, apparatuses, and computer programs described herein, including configurations that combine, omit, and/or add aspects and/or components.

As shown in FIG. 2A, the system environment includes one or more user equipment (UE) 102 configured to communicate wirelessly, such as via an access network, with a network 106. Although the user equipment may be configured in a variety of different manners, the user equipment may be embodied as a mobile terminal, such as a portable digital assistant (PDA), mobile phone, smartphone, pager, mobile television, gaming device, laptop computer, camera, tablet computer, communicator, pad, headset, touch surface, video recorder, audio/video player, radio, electronic book, positioning device (e.g., global positioning system (GPS) device), or any combination of the aforementioned, and other types of voice and text and multi-modal communications systems. System environment 100, as depicted in FIG. 2A, also includes one or more access points 104*a* and 104*b*, such as base stations, including but not limited to node Bs, evolved Node Bs (eNB), or the like. A cellular access point, such as a base station, may define and service one or more cells. The access points may, in turn, be in communication with a network 106, such as a core network via a gateway, such that the access points establish cellular radio access networks by which the user equipment 102 may communicate with the network. The system environment 100 of FIG. 2A may include a plurality of different cellular radio access cells and/or networks or parts of such networks including, for example, a 5G radio access network, an LTE (Long-Term Evolution) radio access network, a UMTS (universal mobile telecommunications system) radio access network, etc. In some example implementations, equipment and other infrastructure associated with multiple different cellular radio access networks may be located at or near structures and/or other equipment associated with a particular access point, such as access point 104*a* and 104*b*.

In some implementations of system environment 100, the cellular radio access networks serviced by access points 104*a*, 104*b*, and any other access points in a given area are identical, in the sense that as user equipment 102 moves from an area serviced by access point 104*a* to an area serviced by access point 104*b*. The user equipment 102 is able to access the network 106 via a radio access network provided across access points. Although not shown, the system may also include a controller associated with one or more of the cellular access points, such as, base stations, for example, so as to facilitate operation of the access points and management of the user equipment 102 in communication therewith. As shown in FIG. 2A, a system may also include one or more wireless networks such as but not limited to a wireless local area network (WLANs), wireless fidelity (Wifi) network, Bluetooth® communication network and/or the like. In certain embodiments, a network may be serviced by an access point 108 configured to establish wireless communications with the user equipment. As such, the user equipment may communicate with the network via an access point as shown in solid lines in FIG. 2A, or, alternatively, via a cellular access point as shown in dashed lines. The radio access networks as well as the core networks may consist of additional network elements as routers, switches, servers, gateways, and/or controllers.

In this regard, facilitation of per-instance parameter handling of a stream filter instance table, as discussed in further detail herein, can be accomplished by an apparatus 200 as depicted in FIG. 2B. The apparatus 200 may be embodied by and/or incorporated into one or more components in a communication system, for example the components of FIG.

1A, such as but not limited to a TSN AF 30, DS-TT 22, and/or NW-TT 24. Still further, the apparatus 200 may be embodied by and/or incorporated into devices that may be incorporated or otherwise associated with system environment 100. Alternatively, the apparatus 200 may be embodied by another device, external to such devices. For example, the apparatus may be embodied by a computing device, such as a personal computer, a computer workstation, a server or the like, or by any of various mobile computing devices, such as a mobile terminal, including but not limited to a smartphone, a tablet computer, or the like, for example.

In some embodiments, the system environment 100 may include, for example, one or more of the following: Authentication Server Function (AUSF), Access and Mobility Management Function (AMF) 40, Data Network (DN), e.g. operator services, Internet access or 3rd party services, Unstructured Data Storage Function (UDSF), Network Exposure Function (NEF) 50, Network Repository Function (NRF), Network Slice Selection Function (NSSF), Policy Control Function (PCF) 46, Session Management Function (SMF) 42, Unified Data Management (UDM), Unified Data Repository (UDR), User Plane Function (UPF) 25, UE radio Capability Management Function (UCMF), Application Function (AF), User Equipment (UE), Next Generation-Radio Access Network (NG-RAN), 5G-Equipment Identity Register (5G-EIR), Network Data Analytics Function (NWDAF), and Charging Function (CHF). The system environment may further comprise on or more network entities, such as a Service Communication Proxy (SCP) and/or Security Edge Protection Proxy (SEPP).

Regardless of the manner in which the apparatus 200 is embodied, the apparatus of an example embodiment is configured to include or otherwise be in communication with a processor 202, a memory device 204, and a communication interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means including processing circuitry, such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 may optionally include the communication interface 208. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In an example embodiment, at least one of, or each of the instances in the stream filter instance table can be treated separately. Processor 202 directs TSN AF 30 to send a message to obtain the current values of one or more stream filter instances in the TT or set the values of one or more stream filter instances in the TT by providing a stream filter instance value for at least one of, or each of the stream filter instances. As a response to the message from the TSN AF 30, the TT sends a message, such as via communication interface 208, including the current values of one or more stream filter instances in the TT or update results of one or more stream filter instances in the TT by providing a stream filter instance value for at least one of, or each of the stream filter instances.

If the TSN AF 30 is subscribed to be notified by the TT if the values of stream filter instance table are changed, the TT sends a message including the current values of one or more stream filter instances in the TT that have been changed.

In order to signal to the TSN AF 30 (TT) that the TT (TSN AF 30) supports the per-instance parameter handling for stream filter instance table, the TT (TSN AF 30) informs whether the TT (TSN AF 30) supports per-instance parameter handling for stream filter instance table. The TSN AF 30 (TT) enables per-instance parameter handling for stream filter instance table if the TT (TSN AF 30) indicates that per-instance parameter handling for stream filter instance table is supported (and the TSN AF 30 (TT) supports per-instance parameter handling for stream filter instance table).

Although referenced frequently herein as a DS-TT 22, any entity configured to manage device side TSN translation for a device may be substituted, according to certain example embodiments. Although frequently referenced herein as a NW-TT 24, any entity configured to manage network side TSN translation for a mobile communication system may be substituted, according to certain example embodiments. Additionally, DS-TT 22 and NW-TT 24 may both be referenced herein as a TT. In certain embodiments, the device on which the ports (e.g., Ethernet ports) discussed herein are configured, may comprise the entity (e.g., TT), that facilitates management of the configuration as described herein according to an example embodiment.

FIG. 3 is a flowchart of operations according to certain embodiments. As shown in operation 300, apparatus 200 includes means, such as processor 202, memory 204, and/or communication interface 208, for setting a feature support IE in a message pertaining to port management (e.g., Ethernet port management).

For example, FIG. 4A depicts a DS-TT-initiated Ethernet port management capability procedure, such as defined in 3GPP TS 24.519 FIG. 5.2.3.2.1 and clause 5.2.3.2, for example. Processor 202 of certain example embodiments, such as the DS-TT 22, includes the DS-TT feature support information element (IE) in a capability message, such as the ETHERNET PORT MANAGEMENT CAPABILITY message 440, for example, to provide Ethernet port management capabilities supported by the DS-TT 22. The DS-TT 22 may set the per-instance parameter handling for stream filter instance table indicator in the DS-TT feature support IE to "per-instance parameter handling for stream filter instance table supported" (e.g., with a bit value of 1).

Accordingly, a message definition or protocol for managing port capability, such as the ETHERNET PORT MANAGEMENT CAPABILITY in Table 8.6.1.1 of 3GPP TS 24.519, may be expanded to include an IE for DS-TT feature support. The field may be optional, may have a predefined format, such as a format of type-length value (TLV) and a predefined length, such as a length of 3 octets. Any variation of the message content may be contemplated.

As additional examples of operation 300, FIGS. 4B and 4C (respective FIGS. 5.2.1.2.1 and 6.2.1.2.1 in 3GPP TS 24.519) illustrate MANAGE ETHERNET PORT COMMANDs 450 and 452, respectively. In FIG. 4B, the MANAGE ETHERNET PORT COMMAND may be associated with a network-requested port management procedure initiation, such as the network-requested Ethernet port management procedure described in clause 5.2.1.2 of 3GPP TS 24.519 to obtain the current values of Ethernet port management parameters at the TT and/or set the values of Ethernet port management parameters at the TT.

As illustrated in FIG. 4C, the MANAGE ETHERNET PORT COMMAND may be associated with a TSN AF 30-requested port management procedure initiation, as described in clause 6.2.1.2 of 3GPP TS 24.519.

In either or both cases illustrated in FIG. 4B or 4C, the processor 202 associated with a network function, such as TSN AF 30, may include a TSN AF 30 feature support IE in the port management command, such as the MANAGE ETHERNET PORT COMMAND, such as sent to the DS-TT 22 (450 of FIG. 4B) or NW-TT 24 (452 of FIG. 4C) to manage the Ethernet port at the DS-TT 22 or NW-TT 24. In this regard, a processor 202 of an example embodiment, may set a TSN AF 30 feature support IE to "Per-instance parameter handling for stream filter instance table supported," or bit value of 1.

Accordingly, a message definition such as the message definition in 8.1.1 of 3GPP TS 24.519 may be expanded to include the TSN AF 30 feature support IE. The TSN AF feature support IE may be optional in the MANAGE ETHERNET PORT COMMAND. The field may have a predefined format, such as a format of type-length value (TLV) and a predefined length, such as a length of 3 octets. Any variation of the message content may be contemplated.

As further illustrated in FIGS. 4B and 4C, port management completion messages, such as a MANAGE ETHERNET PORT COMPLETE message may be returned to the TSN AF 30 to report a status of an associated port or to report an update result and/or status of an associated port. According to operation 300, the feature support IE may be further set by processor 202 of an example embodiment such as a DS-TT 22 and/or NW-TT 24, in conjunction with the MANAGE ETHERNET PORT COMPLETE messages 451 and 453, such as those referenced in FIGS. 4B and 4C and transmitted respectively, such as via communication interface(s) 208, by an entity such as DS-TT 22 and/or NW-TT 24.

For example, a feature support IE, such as a TT feature support (e.g., DS-TT 22 or NW-TT feature support IE may be included in the MANAGE ETHERNET PORT COMPLETE as defined in clause 8.2.1.1 of 3GPP TS 24.519. The field may be optional, may have a predefined format, such as a format of type-length value (TLV) and a predefined length, such as a length of 3 octets. Any variation of the message content may be contemplated.

In certain embodiments, the processor 202 of an example embodiment, such as the DS-TT 22 and/or NW-TT 24 can choose to include the TT feature support IE in the MANAGE ETHERNET PORT COMPLETE message and set the Per-instance parameter handling for stream filter instance table indicator in the feature support IE to "Per-instance parameter handling for stream filter instance table supported" (e.g. if the TT did not already indicate the support for per-instance parameter handling for stream filter instance). In this regard, sending of the IE in the MANAGE ETHERNET PORT COMPLETE message may be considered optional.

As shown in operation 302, apparatus 200 includes means, such as processor 202, memory 204, and/or communication interface 208, for determining whether the per-instance parameter handling of a stream filter instance table is supported. Thus, the processor 202 of a recipient entity of a message such as those depicted in any of FIGS. 4A-4C may access the feature support IE to determine if the per-instance parameter handling of a stream filter instance table is supported (e.g., the feature support IE bit set to 1), or not supported (e.g., the feature support IE bit set to 0). In this regard, the message may be received over the communication interface 208, and processor 202 of an example embodiment may access the feature support IE to determine support of the per-instance parameter handling of a stream filter instance table. Example specifications for the feature support IE are described in further detail below.

As shown in operation 304, apparatus 200 includes means, such as processor 202, memory 204, and/or communication interface 208, for, in an instance the per-instance parameter handling of a stream filter instance table is supported, populating a stream filter instance value in at least one stream filter instance of a stream filter instance table, by at least one of a network function (e.g., TSN AF 30) or another entity such as one configured to facilitate TSN translation at a device side and/or network side (e.g., DS-TT 22 and/or NW-TT 24).

Accordingly, the stream filter instance value in some or in each stream filter instance of a stream filter instance table may be populated by the network function (e.g., TSN AF 30) if the entity (e.g., DS-TT 22 and/or NW-TT 24) indicates that per-instance parameter handling of a stream filter instance table is supported.

In certain embodiments, the stream filter instance value in some or in each stream filter instance of a stream filter instance table is populated by processor 202 of the entity (e.g., DS-TT 22 and/or NW-TT 24) if the network function (e.g., TSN AF 30) indicates that per-instance parameter handling of a stream filter instance table is supported.

In certain embodiments, a check or condition to determine support may be considered optional, and processor 202 of an example embodiment, such as apparatus 200, may populate the stream filter instance value independent of the feature support IE described in operation 300.

In certain embodiments, determining whether the per-instance parameter handling of a stream filter instance table is supported comprises accessing by processor 202 a feature support IE received in a message, that may be populated by the TSN AF 30, DS-TT 22, and/or NW-TT 24 as described above with respect to operation 300. For example, any of the messages illustrated in FIGS. 4A, 4B, and/or 4C may include the IE indicating whether per-instance parameter handling of a stream filter instance table is supported and the recipient component or system of the message may access the IE to determine if per-instance parameter handling of a stream filter instance table is supported by the initiator of the message.

For example, in certain embodiments, operation 304, population of a stream filter instance value, may be performed by processor 202 of a TT such as a DS-TT 22 and/or NW-TT 24. If the Per-instance parameter handling for stream filter instance table indicator in the TSN AF 30 feature support IE is set to "Per-instance parameter handling for stream filter instance table supported," or a bit value of 1, for example, the processor 202 of apparatus 200 such as a DS-TT 22 and/or NW-TT 24 determines that the TSN AF 30 supports per-instance parameter handling for stream filter instance table. If the NW DS-TT 22 and/or NW-TT 24 TT determines that the per-instant parameter handling is supported, DS-TT 22 and/or NW-TT 24 includes a StreamFilterInstance value for the stream filter instance, such as according the table definition provided according to certain example embodiments, such as the table definition illustrated in FIG. 5, and/or clause 9.8 of 3GPP TS 24.519 as proposed to be modified as disclosed herein.

In certain embodiments, operation 304, including populating a stream filter instance value, may be performed by a processor 202 of a TSN AF 30. If the per-instance parameter handling for stream filter instance table indicator in a TT feature support IE (e.g., NW-TT feature support IE or DS-TT feature support IE) is set to "per-instance parameter handling for stream filter instance table supported", the processor 202 of the TSN AF 30 determines that the TT supports per-instance parameter handling for stream filter instance table. If the TSN AF 30 determines the per-instance parameter handling is supported, the TSN AF 30 includes a StreamFilterInstance value for the stream filter instance sets the stream filter instance value, such as according to the table definition provided according to example embodiments, such as the table definition illustrated in FIG. 5, and/or clause 9.8 of 3GPP TS 24.519 as proposed to be modified as described herein.

FIG. 5 provides an example stream filter instance definition. The dashed line indicates the StreamFilterInstance value proposed to be added to the stream filter instance according to an example embodiment provided herein, to facilitate per-instance parameter handling of a stream filter instance table. In certain embodiments, the StreamFilterInstance value may be referred to as a StreamFilterInstanceIndex value. A stream filter instance value may be included for at least one of, or each stream filter instance n, such as the n stream filter instances indicated in the table of FIG. 1B. Accordingly, as illustrated in FIG. 5, the StreamFilterInstance value, or index value, may occupy octets m−3 to m. At least one of, or each StreamFilterInstance value, or index value, may contain the value of StreamFilterInstance as specified in IEEE Std 802.1Q [7] table 12-32.

FIG. 6A provides an example specification for a TSN feature support IE according to an example embodiment. The purpose of the TSN AF 30 feature support IE is to indicate whether certain features are supported by processor 202 of the TSN AF 30. The TSN AF feature support IE field may be optional, may have a predefined format, such as a format of type 41E, and a predefined length, such as a length of 3 octets. Any variation of the message content may be contemplated.

In one example embodiment, the Per-Inst indicator in octet 3, bit 1 may indicate the support of per-instance parameter handling for stream filter instance table.

FIG. 6B provides an example specification for a TT feature support IE according to an example embodiment. The purpose of the TSN AF feature support IE is to indicate whether certain features are supported by the processor 202 of the DS-TT 22 or NW-TT 24. The TT feature support IE field may be optional, may have a predefined format, such as a format of type 41E, and a predefined length, such as a length of 3 octets. In one example embodiment, the Per-Inst indicator in octet 3, bit 1 may indicate the support of per-instance parameter handling for stream filter instance table.

According to an example embodiment, and the example specifications provided in FIGS. 6A and 6B, processor 202 may set a Per-Inst bit to 0 to indicate per-instance parameter handling for stream filter instance table is not supported. Processor 202 may set a Per-Inst bit may be set to 1 to indicate per-instance parameter handling for stream filter instance table is supported. Other variations may be contemplated (such as reversing the coding of a bit as 0 to 1), presuming uniform or consistent adoption amongst components of the system in FIG. 1A.

If the feature support IE is not included in any of the messages described herein, processor 202 of a recipient of the message, such as the TSN AF 30, DS-TT 22 and/or NW-TT 24 may process the message as if the field is coded with all bits as 0, or that per-instance parameter handling for stream filter instance table is not supported.

According to certain example embodiments provided herein, the TSN AF 30 and TT can exchange a particular set of instances' values of the stream filter instance table, which is more efficient than exchanging all instances' values of the stream filter instance table. Since the TT and/or TSN AF 30 may indicate whether per-instance parameter handling for stream filter instance table I supported, and per-instance parameter handling for stream filter instance table can be enabled if both TT and TSN AF 30 support the feature, backward compatibility can be ensured. For example, the TSN AF 30 and/or TT can fall back to the legacy mechanism (exchanging all instances' values of the stream filter instance table) if the other of the TSN AF 30 and/or TT does not support the feature.

FIG. 7A is a flowchart of operations that may be performed according to certain example embodiments, such as when apparatus 200 is implemented as an initiator of a message, such as but not limited to a network function, such as TSN AF 30, and/or a TT such as DS-TT 22 and/or NS-TT 24. In operation 700, apparatus 200 includes means, such as processor 202, memory 204, and/or communication interface 208, for setting a feature support information element in a message pertaining to port management to indicate whether per-instance parameter handling of the stream filter instance table is supported. For example, as described with respect to operation 440 in FIG. 4A, the DS-TT 22 may set a feature support information element in a message. As described above with respect to operations 450 and/or 452, the TSN AF 30 may set the feature support information element in MANAGE ETHERNET PORT COMMANDs.

As shown in operation 702, apparatus 200 includes means, such as processor 202, memory 204, and/or communication interface 208, for managing configuration of one or more ports in a device or a mobile communication system integrated with a time sensitive networking (TSN) network by populating, by at least one of a network function or an entity (e.g., DS-TT 22 and/or NS-TT 24) associated with the device or the mobile communication system, a stream filter instance value in at least one stream filter instance of a stream filter instance table. For example, as described with respect to operations 450 and/or 452, the TSN AF 30 may manage configuration of one or more ports in a device or a mobile communication system integrated with a time sensitive networking (TSN) network by populating a stream filter instance value in at least one stream filter instance of a stream filter instance table in MANAGE ETHERNET PORT COMMANDs.

In certain embodiments, the network function and the entity described with respect to operation 702 are embodied by a common device, for example, the device may be a NW-TT and the entity is in communication therewith, such that the network function and the entity are embodied by a common device.

At operation 704, apparatus 200 includes means, such as processor 202, memory 204, and/or communication interface 208, for causing transmission of the message. For example, with respect to operations 450 and 452, the message is respectively transmitted to the DS-TT 22 and NW-TT.

FIG. 7B is a flowchart of operations that may be performed according to example embodiments, such as when apparatus 200 is implemented as a recipient of a message, such as but not limited to a network function, such as TSN AF 30, and/or a TT, such as DS-TT 22 and/or NS-TT 24.

At operation 720, apparatus 200 includes means, such as processor 202, memory 204, and/or communication interface 208, for determining, based on a received message, that per-instance parameter handling of a stream filter instance table is supported. For example, determining whether per-instance parameter handling of a stream filter instance table is supported may comprise reading the feature support information element, such as one set in a message, such as with respect to operation 700.

As shown by operation 722, apparatus 200 includes means, such as processor 202, memory 204, and/or communication interface 208, for managing configuration of one or more ports in in a device or a mobile communication system integrated with a time sensitive networking (TSN) network by populating a stream filter instance value in at least one stream filter instance of a stream filter instance table. In this regard, the message recipient reads the message and manages configuration of the ethernet port accordingly. For example, see operation 304.

As shown by operation 724, apparatus 200 includes means, such as processor 202, memory 204, and/or communication interface 208, for reporting the status of the port configuration. For example, as described with respect to operations 451, and 453, apparatus 200, such as the DS-TT 22 and/or NW-TT 24 may initiate a MANAGE ETHERNET PORT COMPLETE MESSAGE, and cause transmission of the message to the TSN AF.

As described above, FIGS. 3, 7A and 7B include flowcharts of operations performed by an apparatus, method, and computer program product according to certain example embodiments. It will be understood that each block of the flowcharts, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 204 of an apparatus employing an embodiment of the present invention and executed by processor 202 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowchart of FIG. 3. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as represented by the blocks outlined in dashed lines. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe certain example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:

receiving, by a time-sensitive networking (TSN) application function from a TSN translator, an indication that indicates per-stream filter instance handling of a stream filter instance table is supported by the TSN translator;

managing, by the TSN application function, port parameters related to ports in a time-sensitive networking (TSN) translator of a TSN network, wherein the port parameters comprise the stream filter instance table, and the stream filter instance table comprises n stream filter instances, wherein respective stream filter instances of the n stream filter instances comprise a Priority Spec value, a StreamGateInstanceID value, a tsnStreamIdIdentificationType value, and one or more tsnStreamIdParameters, and wherein the managing, by the TSN application function, the port parameters comprises:

based on the indication that indicates per-stream filter instance handling of the stream filter instance table is supported by the TSN translator, including, in one or more stream filter instances of the n stream filter instances, a stream filter instance index value, wherein the stream filter instance index value identifies the stream filter instance in the stream filter instance table;

transmitting, by the TSN application function to the TSN translator, a manage port command message to set values of one or more stream filter instances of n stream filter instances at the TSN translator, the manage port command message comprising, for each of the one or more stream filter instances, the stream filter instance index value and stream filter instance values; and receiving, by the TSN application function from the TSN translator, a response to the manage port command message, the response comprising the stream filter instance index values of respective ones of the one or more stream filter instances, and current values of respective ones of the one or more stream filter instances.

2. The method according to claim 1, wherein the ports comprise Ethernet ports.

3. The method according to claim 1, wherein the TSN translator comprises a device side TSN translator (DS-TT) or a network side TSN translator (NW-TT).

4. The method according to claim 1, wherein the TSN translator comprises a device side TSN translator (DS-TT) and wherein a device comprises the DS-TT.

5. The method according to claim 1, wherein the TSN translator comprises a network side TSN translator (NW-TT) and wherein the NW-TT and a user plane function are embodied by a common device.

6. The method according to claim 1, further comprising:

setting, by the TSN application function, a feature support information element in a message to a value that indicates per-stream filter instance handling of the stream filter instance table is supported by the TSN application function; and transmitting, by the TSN application function to the TSN translator, the message.

7. The method according to claim 1, wherein each stream filter instance index value enables the TSN application function to select an individual stream filter instance in the stream filter instance table for the TSN translator to set a value for the respective stream filter instance.

8. A method comprising:

receiving, by a time-sensitive networking (TSN) application function from a TSN translator, an indication that indicates per-stream filter instance handling of a stream filter instance table is supported by the TSN translator;

managing port parameters related to ports in the TSN translator of a TSN network, wherein the port parameters comprise the stream filter instance table and the stream filter instance table comprises n stream filter instances, wherein respective stream filter instances of the n stream filter instances comprise a PrioritySpec value, a StreamGateInstanceID value, a tsnStreamIdIdentificationType value, and one or more tsnStreamIdParameters, and wherein the managing the port parameters comprises:

based on the indication that indicates per-stream filter instance handling of the stream filter instance table is supported by the TSN translator, including, in one or more stream filter instances of the n stream filter instances, a stream filter instance index value, wherein the stream filter instance index value identifies the stream filter instance in the stream filter instance table;

transmitting, by the TSN application function to the TSN translator, a manage port command message to obtain current values of one or more stream filter instances of the n stream filter instances at the TSN translator, the manage port command message comprising, for each of the one or more stream filter instances, the stream filter instance index value; and receiving, by the TSN application function from the TSN translator, a response to the manage port command message, the response comprising the stream filter instance index values and current values of respective ones of the one or more stream filter instances.

9. The method according to claim 8, wherein each stream filter instance index value enables the TSN translator to identify an individual stream filter instance in the stream filter instance table for reporting to the TSN application function a value for the respective stream filter instance.

10. A method comprising:

receiving, by a time-sensitive networking (TSN) application function from a TSN translator, an indication that indicates per-stream filter instance handling of a stream filter instance table is supported by the TSN translator;

receiving, by a the TSN translator from a TSN application function of a TSN network, a manage port command message, wherein the TSN translator comprises ports and port parameters associated with the ports, wherein the port parameters comprise the stream filter instance table and the stream filter instance table comprises n stream filter instances, wherein respective stream filter instances of the n stream filter instances comprise a PrioritySpec value, a StreamGateInstanceID value, a tsnStreamIdIdentificationType value, one or more tsnStreamIdParameters, and a stream filter instance index value, wherein the stream filter instance index value identifies the stream filter instance in the stream filter instance table, and wherein the manage port management command comprises a manage port command message to set values of one or more stream filter instances of the n stream filter instances, the manage port command message comprising the stream filter instance index value of respective ones of the one or more stream filter instances and values for the one or more stream filter instances;

based on the indication that indicates per-stream filter instance handling of the stream filter instance table is supported by the TSN translator, setting by the TSN translator, values of respective ones of the one or more stream filter instances to the values in the manage port command message; and transmitting, by the TSN translator to the TSN application function, a response to the manage port command message, the response comprising the stream filter instance index value and current values of respective ones of the one or more stream filter instances.

11. The method according to claim 10, wherein each stream filter instance index value enables the TSN application function to select an individual stream filter instance in the stream filter instance table for the TSN translator to set a value for the respective stream filter instance.

12. A method comprising:

receiving, by a time-sensitive networking (TSN) application function from a TSN translator, an indication that indicates per-stream filter instance handling of a stream filter instance table is supported by the TSN translator;

receiving, by the TSN translator from a TSN application function of the TSN network, a manage port command message, wherein the TSN translator comprises ports and port parameters associated with the ports, wherein the port parameters comprise a stream filter instance table comprising n stream filter instances, wherein respective stream filter instances of the n stream filter instances comprise a PrioritySpec value, a StreamGateInstanceID value, a tsnStreamIdIdentificationType value, one or more tsnStreamIdParameters, and a stream filter instance index value, wherein the stream filter instance index value identifies the stream filter instance in the stream filter instance table, and wherein the manage port management command comprises a manage port command message to obtain values of one or more stream filter instances of the n stream filter instances, the port management command message comprising the stream filter instance index value of respective ones of the one or more stream filter instances;

based on the indication that indicates per-stream filter instance handling of the stream filter instance table is supported by the TSN translator, retrieving current values of respective ones of the one or more stream filter instances; and transmitting, by the TSN translator to the TSN application function, a response to the manage port management message, the response comprising the stream filter instance index value and the current values of respective ones of the one or more stream filter instances.

13. The method according to claim 12, wherein each stream filter instance index value enables the TSN translator to identify an individual stream filter instance in the stream filter instance table for reporting to the TSN application function a value for the respective stream filter instance.

* * * * *